United States Patent [19]

Meisel, Jr.

[11] Patent Number: 4,530,546
[45] Date of Patent: Jul. 23, 1985

[54] ENDLESS TRACK COUPLING APPARATUS
[75] Inventor: Thomas C. Meisel, Jr., Peoria, Ill.
[73] Assignee: Caterpillar Tractor Co., Peoria, Ill.
[21] Appl. No.: 573,973
[22] PCT Filed: Mar. 12, 1982
[86] PCT No.: PCT/US82/00316
§ 371 Date: Mar. 12, 1982
§ 102(e) Date: Mar. 12, 1982
[87] PCT Pub. No.: WO83/03231
PCT Pub. Date: Sep. 29, 1983
[51] Int. Cl.³ .......................................... B62D 55/20
[52] U.S. Cl. ........................................ 305/39; 305/54
[58] Field of Search ............... 305/39, 54, 58 R, 19, 305/56; 180/9.5

[56] References Cited
U.S. PATENT DOCUMENTS

| | | | |
|---|---|---|---|
| 1,402,186 | 1/1922 | Stahl | 180/9.5 |
| 3,020,096 | 2/1962 | Strand | 305/58 |
| 3,357,750 | 12/1967 | Reynolds et al. | 305/11 |
| 3,427,079 | 2/1969 | Skromme et al. | 305/58 |
| 3,601,212 | 8/1971 | Petersen et al. | 305/19 X |
| 3,853,360 | 12/1974 | Khuntia | 305/58 |
| 4,050,750 | 9/1977 | Yoshihashi et al. | 305/54 |
| 4,114,958 | 9/1978 | Boggs | 305/56 |
| 4,262,973 | 4/1981 | Grilli et al. | 305/54 |

FOREIGN PATENT DOCUMENTS

WO81/00543 3/1981 PCT Int'l Appl. .............. 305/39

Primary Examiner—David A. Scherbel
Attorney, Agent, or Firm—Claude F. White

[57] ABSTRACT

A coupling apparatus (32) releasably joins the ends of an endless track (12) of a track-type vehicle (10). The coupling apparatus (32) has first and second coupling assemblies (31,33) with each assembly having a pair of coupling members (34,36,40,42) which are pivotally joined by a pin (38,44). Each coupling assembly (31,33) is offset laterally from the links (14) of the endless track (12), and threaded fasteners (46) secure the coupling assemblies (31,33) to shoes (20) of the endless track (12). Conventional endless track assemblies include a plurality of links, bushings, pins, and shoes, and the track is releasably joined by a master link or joint, which is also used to separate the endless track. Master links are structurally weaker than regular links, and use of such master links can result in unexpected and accelerated wear of the track. The subject coupling apparatus (32) securely joins the endless track (12) and releases the track by removing threaded fasteners which secure the first and second coupling assemblies (31,33) to the shoes of the endless track.

5 Claims, 4 Drawing Figures

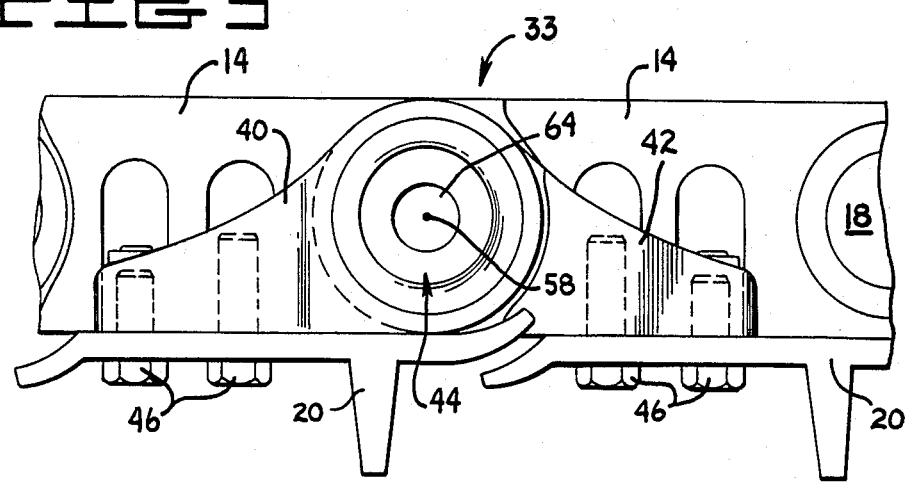
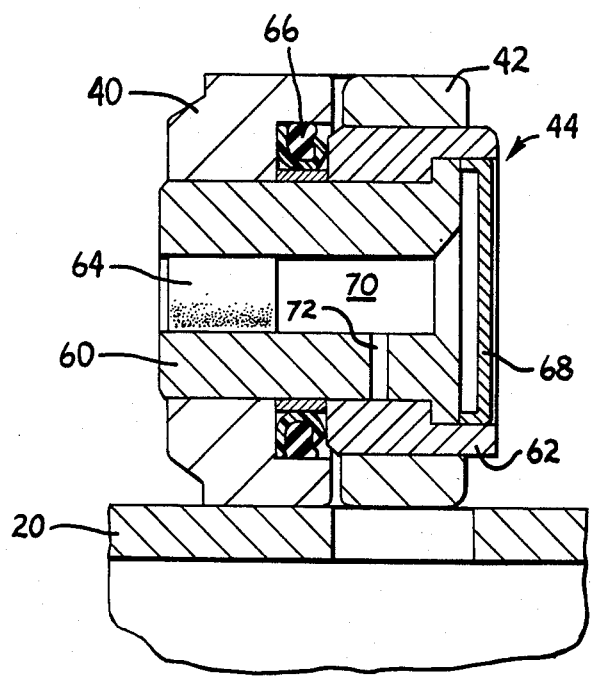

ENDLESS TRACK COUPLING APPARATUS

DESCRIPTION

1. Technical Field

This invention relates generally to apparatus for connecting components of an endless track and more particularly to coupling assemblies which releasably connect together the track shoes of the endless track. The coupling assemblies are laterally spaced from the links and pins of the endless track.

2. Background Art

Track-type vehicles which are used for construction and earthmoving functions are supported and propelled by an endless track assembly on each side of the vehicle. These track assemblies generally include a plurality of interconnected track links, bushings, pins, and track shoes, which are commonly referred to as a track chain. To form the endless track, opposite ends of the track chain are joined together into an endless loop. To facilitate connecting and disconnecting of the track chain ends, various types of connecting joints and master links are utilized.

One type of master link for joining the ends of an endless chain is shown in U.S. Pat. No. 4,262,973, issued to Walter Grilli et al. on April 21, 1981. This master link consists of two separate pieces which simulate a conventional link, and are joined by a key member. The key member fits within grooves formed in the two separate pieces. Because this master link is formed of two separate pieces, it does not have the strength of a regular one piece link, and therefore becomes a weak point of the chain.

Another type of master link is shown in U.S. Pat. No. 4,050,750, issued to Akira Yoshikashi et al. on Sept. 27, 1977. This master link also consists of two separate link pieces which fit together along a diagonal juncture. Each of the two link pieces has a cavity, when joined, form a hollow space. A thrust pin or other type bearing member is fitted into the hollow space to resist the traction and thrust forces. Track shoe bolts extend through both link pieces to secure the pieces together. As in the previously-noted master link, this link assembly does not have the strength of a regular one piece link and, additionally, is a rather complex multi-part link assembly.

U.S. Pat. No. 3,357,750 discloses an endless crawler track chain assembly which is formed of a plurality of leaf hinge units which are bolted together. The leaf hinges are permanently pre-assembled from three members and are pinned together by a rubber bushed pin. The plurality of pre-assembled leaf hinges are thereafter bolted together to form the endless track chain. The bolts which secure the leaf hinges together also secure the hinges to the track shoes.

The particular structure of U.S. Pat. No. 3,357,750 requires no master link as such, since in effect, each leaf hinge unit is detachable from the remainder of the endless chain. However, in view of the plurality of bolted joints which secure the hinge units together, and the rubber bushed pins, this track chain does not have the structural strength and resistance to wear under severe work conditions as a track chain which is formed of press fitted interconnected links, bushings, and solid pins.

The present invention is directed to overcoming one or more of the problems as set forth above.

DISCLOSURE OF THE INVENTION

In one aspect of the present invention, an endless track chain assembly for a vehicle has a plurality of interconnected track links, bushings, pins and shoes, and first and second coupling assemblies. Each coupling assembly is spaced from the links, pins, and bushings and is joined to the track shoes.

Endless track chains for track-type vehicles require some type of releasable joint for assembling and disassembling the endless chain. Prior art joints use a "master link" which includes two or more distinct pieces which are bolted or otherwise joined together in some manner. The master link is an inherently weak portion of the chain, and as such can lead to premature and unexpected failure. The subject invention provides a solution to the problems associated with master links by utilizing coupling apparatus which is separate and distinct from the endless chain. The strength of the endless chain is not weakened by the subject coupling apparatus, yet the chain can be easily coupled and uncoupled.

BRIEF DESCRIPTION OF THE DRAWINGS

FIG. 3 is a diagrammatic side elevational view of an embodiment of the present invention taken generally along the lines III—III of FIG. 2, and FIG. 4 is a diagrammatic sectional view of an embodiment of the present invention taken generally along the lines IV—IV of FIG. 2.

BEST MODE FOR CARRYING OUT THE INVENTION

Figure 1:
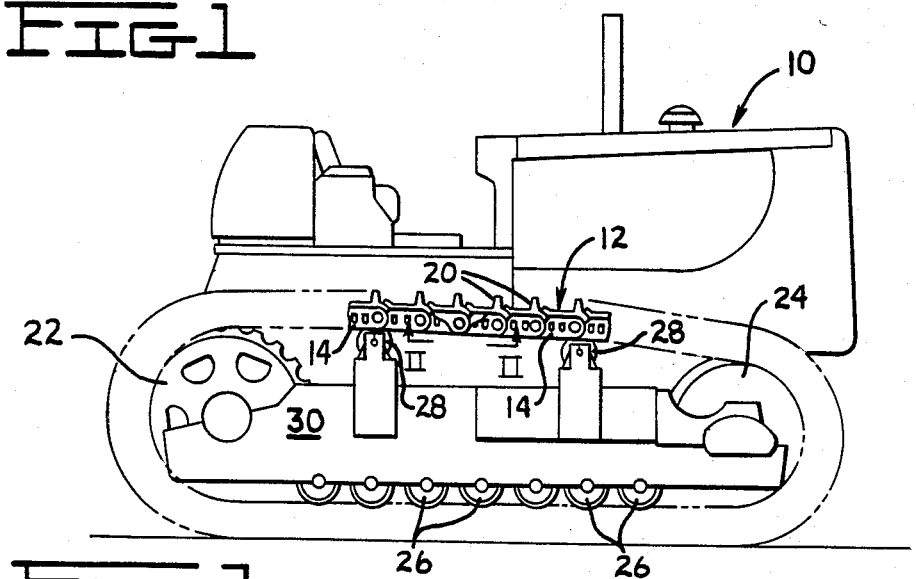
FIG. 1 is a diagrammatic side elevational view of a track-type vehicle embodying the present invention.

Referring to the drawings, a track-type vehicle 10 includes an endless track assembly 12 having a plurality of interconnected track links 14, track bushings 16, track pins 18, and track shoes 20. The endless track assembly 12 is driven by a powered sprocket wheel 22 and is guided and supported by an idler wheel 24, a plurality of track rollers 26, and a pair of support rollers 28. The sprocket 22, idler 24, and rollers 26 are all supported by a track roller frame 30.

Figure 2:
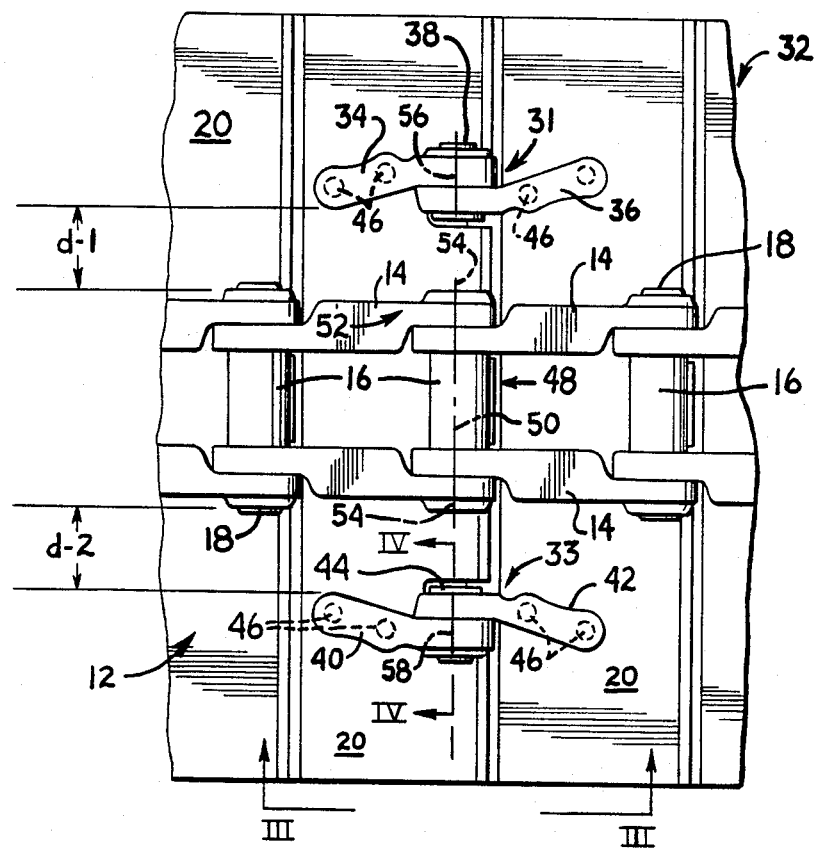
FIG. 2 is a diagrammatic plan view of an embodiment of the present invention taken generally along the lines II—II of FIG. 1.

With particular reference to FIGS. 2, 3, and 4, a coupling apparatus 32, for joining the ends of the endless track assembly 12, includes first and second coupling assemblies 31 and 33. The first coupling assembly 31 includes first and second coupling members 34,36, and a first pin 38 pivotally connecting the first and second coupling members 34,36 together. The second coupling assembly 33 includes third and fourth coupling members 40,42 and a second pin 44 pivotally connecting the third and fourth members 40,42 together. Means 46, such as threaded fasteners, join the coupling members 34,36,40,42 to the track shoes 20.

As can be seen in FIG. 2, the first coupling assembly 31 is positioned on a first side of links 14 and is spaced a specific distance "d-1" from the links 14. The second coupling assembly 33 is positioned on a second, opposite side of links 14 and is spaced a specific distance "d-2" from the links 14. Preferably, "d-1" is substantially equal to "d-2".

The track assembly 12 has a first end portion 48 which has a first longitudinal axis 50, and a second end portion 52 which has a second longitudinal axis 54.

Additionally, the first pin 38 has a third longitudinal axis 56 and the second pin 44 has a fourth longitudinal axis 58. When the coupling members 34,36,40,42 are connected by the first and second pins 38,44 respectively, and the coupling members 34,36,40,42 are joined to the track shoes 20 to connect the first and second end portions 48,52 of the track assembly 12, the first, second, third, and fourth axes 50,54,56,58 are in substantial axial alignment.

For simplicity of manufacturing, storage, and handling, the first and second coupling assemblies 31,33 are, preferably, substantially similar. Likewise, the first, second, third, and fourth coupling members 34,36,40,42 of the assemblies 31,32 are, preferably, substantially similar. Also, the first and second pins 38,44 which join the coupling members 34,36,40,42 are, preferably, substantially similar.

Referring to FIG. 4, the pins 38,44 are, preferably, a sealed and lubricated assembly which includes an inner tubular portion 60, an outer bearing portion 62, a plug 64, a seal 66, and an annular cover plate 68. An oil cavity 70 is defined within tubular portion 60 and is closed at one end by the plug 64 and at the other end by the cover plate 68. One or more radial ports 72 can extend through the sidewall of tubular portion 60 to communicate lubricating oil to the bearing surfaces between the pin assembly and the coupling members 40,44. The seal 66 prevents the ingress of contaminants within the pin assembly 44, and maintains the lubricant within the pin assembly 44.

INDUSTRIAL APPLICABILITY

The subject coupling apparatus 32 is particularly useful for releasably joining the opposite ends of an endless track assembly 12. The coupling apparatus 32 eliminates the need for one or more master link connectors within the track assembly 12.

To assemble the endless track 12 to the vehicle 10, using the coupling apparatus 32 of the present invention, the endless track 12 is successively assembled in the conventional manner. This includes joining a plurality of links 14, bushing 16, pins 18, and shoes 20 until the desired length of track is completed. The track assembly 12 is then wrapped around the sprocket 22, idler roller 24, track rollers 26, and support rollers 28. The first end portion 48 is brought into overlapping relationship with the second end portion 52 until the first longitudinal axis 50 is in substantial axial alignment with the second longitudinal axis 54. The subject coupling apparatus 32, which includes the first coupling assembly 31 and the second coupling assembly 33, is thereafter secured to the track assembly 12 to form the endless track assembly 12 and securely hold the endless track 12 together.

Prior to joining the coupling apparatus 32 to the track assembly 12, each of the first and second coupling assemblies 31,33 is pre-assembled. This includes pivotally interconnecting the coupling members 34 and 36 with the first pin assembly 38, and pivotally interconnecting the coupling members 40 and 42 with the second pin assembly 44. The coupling assemblies 31 and 33 are thereafter secured to the track shoes 20 by the threaded fasteners 46, with one coupling assembly positioned on opposed sides of the conventional track links, and laterally spaced from the track links. With the first and second coupling assemblies 31,33 properly joined to the track shoes 20, the longitudinal axes 56,58 of coupling assemblies 31,33 are in substantial axial alignment with longitudinal axes 50,54. It should be noted that no track pin 18 is used in the overlapping juncture between the first and second end portions 48,52 of the track assembly 12.

When the endless track assembly 12 is to be disconnected, for servicing or replacement of particular parts, the first and second coupling assemblies 31,33 are removed from the track assembly by removing the threaded fasteners 46.

Other aspects, objects and advantages of this invention can be obtained from a study of the drawings, the disclosure and the appended claims.

I claim:

1. Apparatus (32) for releasably connecting a first end portion (48) to a second end portion (52) of a track assembly (12), said track assembly (12) having a plurality of pivotal joints, each joint, except one, including a pair of inner links (14), a pair of outer links (14), a bushing (16) connecting said inner links (14), and a pin (18) extending through said bushing (16) and connecting said outer links (14), and a plurality of track shoes (20) connected to said links (14), comprising:

a single discrete first coupling assembly (31) having first and second coupling members (34,36) and a first pin (38);

a single discrete second coupling assembly (33) having third and fourth coupling members (40,42) and a second pin (44), said second coupling assembly (33) being spaced from said first coupling assembly (31) and from said track links (14);

said first and second coupling assemblies (31,33) being substantially similar and free from connection with other coupling assemblies;

means (46) for releasably joining said first and second coupling assemblies (31,33) to said track shoes (20); and, said one pivotal joint including a pair of inner links (14), a pair of outer links (14), a bushing (16) connecting said inner links (14), and being free of a connecting pin (18).

2. The apparatus, as set forth in claim 1, wherein said first coupling assembly (31) is positioned on a first side of said track links (14) and said second coupling assembly (33) is positioned on a second, opposite side of said track links (14).

3. The apparatus, as set forth in claim 1, wherein said first and second coupling assemblies (31,33) are each spaced a substantially equal distance (d-1,d-2) from said track links (14).

4. The apparatus (32), as set forth in claim 1, wherein said first end portion (48) of said track assembly (12) has a first axis (50) and said second end portion (52) has a second axis (54), said first and second coupling assemblies (31,33) having third and fourth axes (56,58), with said first, second, third, and fourth axes (50,54,56,58) being in substantial axial alignment with said first and second coupling assemblies (31,33) joined to said track shoes (20).

5. The apparatus (32), as set forth in claim 1, wherein said first and second coupling assemblies (31,33) are substantially similar.

* * * * *